(12) United States Patent
Tracht et al.

(10) Patent No.: US 7,134,686 B2
(45) Date of Patent: Nov. 14, 2006

(54) VEHICLE SEAT ASSEMBLY

(75) Inventors: Michael L. Tracht, Ingolstadt (DE); Mathias Klemm, Grobenzell (DE)

(73) Assignee: Lear Corporation, Southfield, MI (US)

( * ) Notice: Subject to any disclaimer, the term of this patent is extended or adjusted under 35 U.S.C. 154(b) by 49 days.

(21) Appl. No.: 10/904,831

(22) Filed: Dec. 1, 2004

(65) Prior Publication Data

US 2006/0113760 A1    Jun. 1, 2006

(51) Int. Cl.
*B60R 21/16* (2006.01)

(52) U.S. Cl. .................................... 280/730.2

(58) Field of Classification Search ............ 280/730.2, 280/730.1, 743.1, 728.3
See application file for complete search history.

(56) References Cited

U.S. PATENT DOCUMENTS

| | | |
|---|---|---|
| 5,498,030 A | 3/1996 | Hill et al. |
| 5,678,853 A | 10/1997 | Maly |
| 5,749,597 A | 5/1998 | Saderholm |
| 5,762,363 A | 6/1998 | Brown et al. |
| 5,806,882 A | 9/1998 | Stein et al. |
| 5,816,610 A | 10/1998 | Higashiura et al. |
| 5,860,673 A | 1/1999 | Hasegawa et al. |
| 5,863,063 A | 1/1999 | Harrell |
| 5,927,749 A | 7/1999 | Homier et al. |
| 5,938,232 A | 8/1999 | Kalandek et al. |
| 5,967,603 A | 10/1999 | Genders et al. |
| 6,045,151 A | 4/2000 | Wu |
| 6,155,593 A | 12/2000 | Kimura et al. |
| 6,237,934 B1 | 5/2001 | Harrell et al. |
| 6,588,838 B1 | 7/2003 | Dick, Jr. et al. |

FOREIGN PATENT DOCUMENTS

EP    0 768 216 A1    4/1997

OTHER PUBLICATIONS

U.S. Appl. No. 08/808,572, filed Feb. 28, 1997, Wu et al.

*Primary Examiner*—Faye M. Fleming
(74) *Attorney, Agent, or Firm*—Brooks Kushman P.C.

(57) ABSTRACT

A vehicle seat assembly having a back panel. The back panel includes a door configured to open when the air bag is inflated.

16 Claims, 3 Drawing Sheets

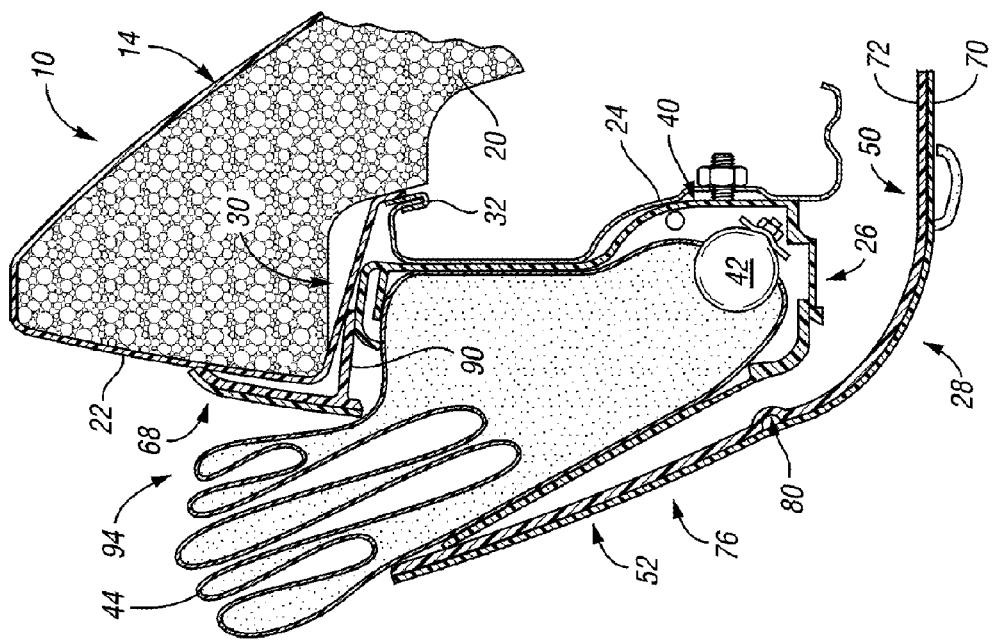
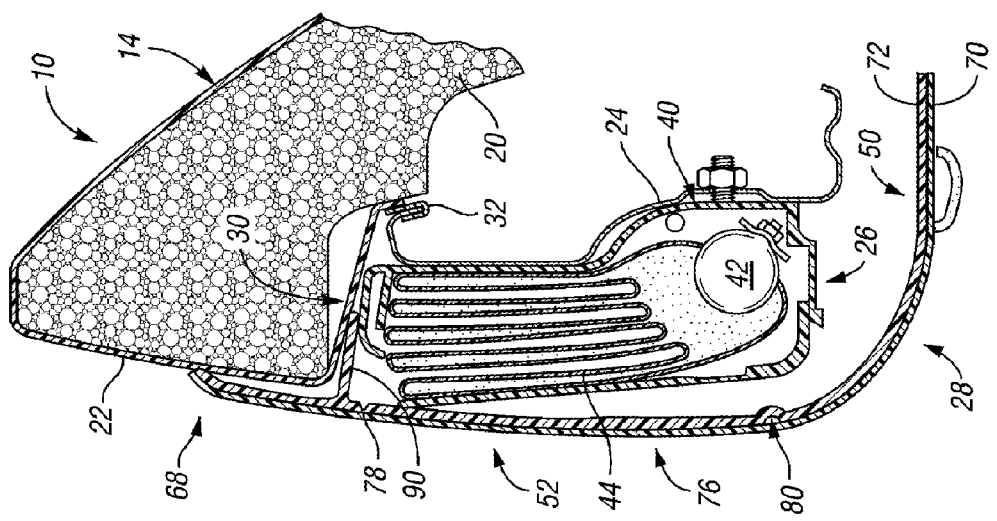
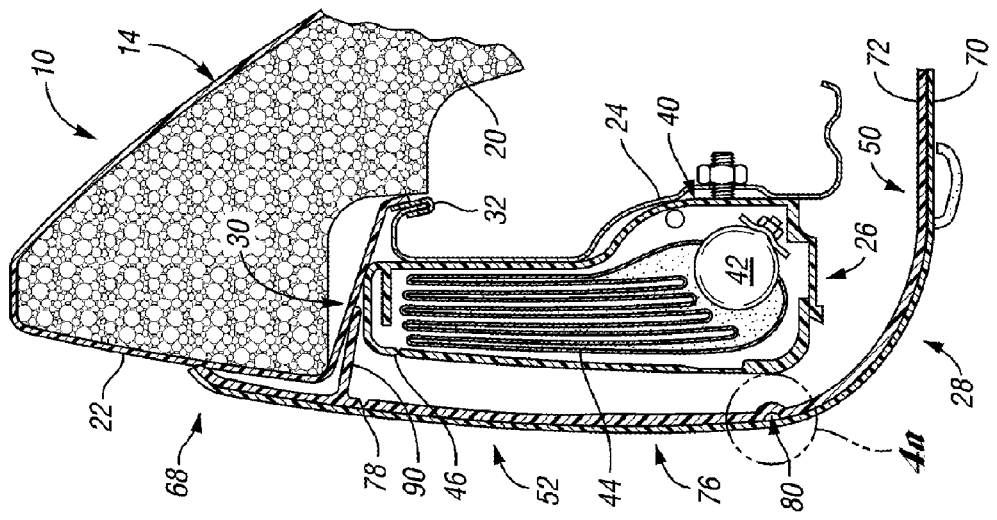

VEHICLE SEAT ASSEMBLY

BACKGROUND OF THE INVENTION

1. Field of the Invention

The present invention relates to a vehicle seat assembly, and in particular, a seat assembly including an air bag.

2. Background Art

Motor vehicles may be equipped with front and side air bags that are inflated to cushion an occupant during a vehicle impact event. Side air bags may be disposed within a vehicle seat assembly.

Previously, an air bag located within a vehicle seat assembly needed to sever or break through seating material or stitched seams before fully deploying to protect an occupant. For example, air bags that deployed through seat pad foam and a seat trim cover are described in U.S. Pat. Nos. 5,816,610, 5,938,232, and 6,045,151, while an air bag that breaks stitched seams that join seat trim cover surfaces is described in U.S. Pat. No. 5,860,673.

SUMMARY OF THE INVENTION

According to one aspect of the present invention, a vehicle seat assembly is provided. The vehicle seat assembly includes a frame, a cushion, a trim cover, an air bag module, and a back panel. The cushion is disposed proximate the frame. The trim cover is disposed proximate the cushion. The air bag module is disposed proximate the frame and includes an air bag and an inflator adapted to provide an inflation gas to inflate the air bag from a stored condition to an inflated condition. The back panel is disposed proximate the trim cover and includes a back portion and a side portion. The side portion includes a hinge, a preweakened section, and an end section. The hinge and preweakened section cooperate to define a door. The end section is disposed proximate the preweakened section and includes an end surface, an interior surface, and a projection. The end surface is disposed proximate the trim cover. The projection extends from the interior surface and directs the air bag toward the door when the air bag is inflated.

The back panel may include a substrate layer and a cover layer disposed proximate the substrate layer. The substrate layer may have a first surface disposed proximate the cover layer and a second surface disposed opposite the first surface. The hinge may be an indentation disposed on the first or second surfaces.

The preweakened section may be disposed on the substrate layer and may extend toward the cover layer.

The side portion may be longer than the air bag module and may conceal the air bag module when the air bag is in the stored condition.

The projection may be disposed between the trim cover and the air bag module and/or between the preweakened section and the trim cover. The projection may be spaced apart from the trim cover and the air bag module. The projection may be integrally formed with the substrate layer.

According to another aspect of the present invention, a vehicle seat assembly is provided. The vehicle seat assembly includes a seat bottom and a seat back disposed proximate the seat bottom. The seat back includes a frame, a cushion, a trim cover, an air bag module, and a back panel. The cushion is associated with the frame. The trim cover is disposed proximate the cushion. A portion of the trim cover defines a front seat surface. The air bag module includes a housing, an air bag, and an inflator. The inflator is configured to supply an inflation gas to the air bag to facilitate deployment of the air bag. The back panel is spaced apart from the air bag module and includes a back portion and a side portion. The side portion is disposed proximate the back portion and extends further toward the front seat surface than the air bag module to conceal the air bag module when the air bag is deflated. The side portion includes a hinge, a preweakened section, and an end section. The hinge and preweakened section cooperate to define a door. The end section is disposed proximate the preweakened section and includes an end surface disposed proximate the trim cover. The preweakened section severs to permit the door to pivot about the hinge when the air bag is deployed.

The end section may include an interior surface and a projection extending from the interior surface. The projection may be adapted to prevent the air bag from contacting the trim cover before the air bag is deployed through the door. The projection may extend toward the housing to prevent the air bag from compressing the cushion when the air bag is inflated.

According to another aspect of the present invention, a vehicle seat assembly is provided. The vehicle seat assembly includes a frame, a cushion, a trim cover, an air bag module, and a back panel. The cushion is disposed proximate the frame. The trim cover is disposed proximate the cushion. The air bag module is disposed proximate the frame and includes a housing, an air bag, and an inflator. The air bag is disposed proximate the housing. The inflator is adapted to provide an inflation gas to inflate the air bag from a stored condition to an inflated condition. The back panel is disposed proximate the trim cover. The back panel includes a hinge, a preweakened section, and an end section. The hinge and the preweakened section cooperate to define a door. The end section is disposed proximate the preweakened section and includes a projection. The projection extends toward the air bag module and prevents the air bag from compressing the cushion when the air bag is inflated to reduce air bag deployment time.

BRIEF DESCRIPTION OF THE DRAWINGS

FIG. 3 is a fragmentary section view of one embodiment of the vehicle seat assembly taken through line 3—3.

FIGS. 5A–5B are fragmentary section views of the vehicle seat assembly shown in FIG. 3, illustrating deployment of an air bag.

DETAILED DESCRIPTION OF THE EMBODIMENT(S)

Figure 1:
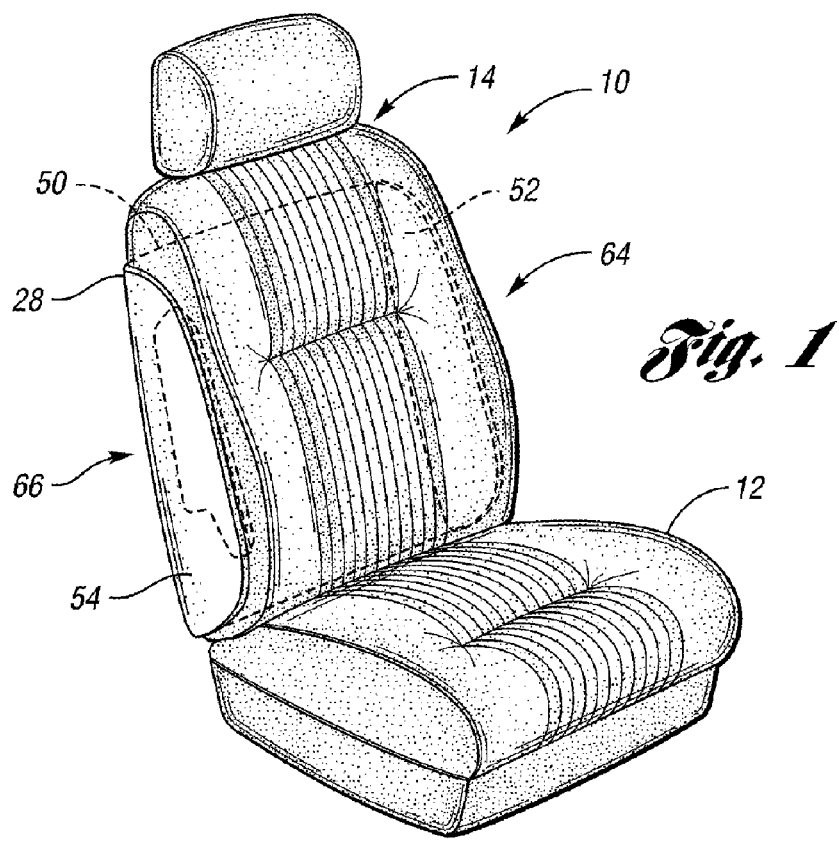
FIG. 1 is a perspective view of a vehicle seat assembly.

Referring to FIG. 1, a seat assembly 10 for a motor vehicle is shown. The seat assembly includes a seat bottom 12 and a seat back 14. The seat bottom 12 is adapted to be mounted on the vehicle. The seat back 14 is disposed proximate the seat bottom 12 and may be adapted to pivot with respect to the seat bottom 12.

Figure 2:
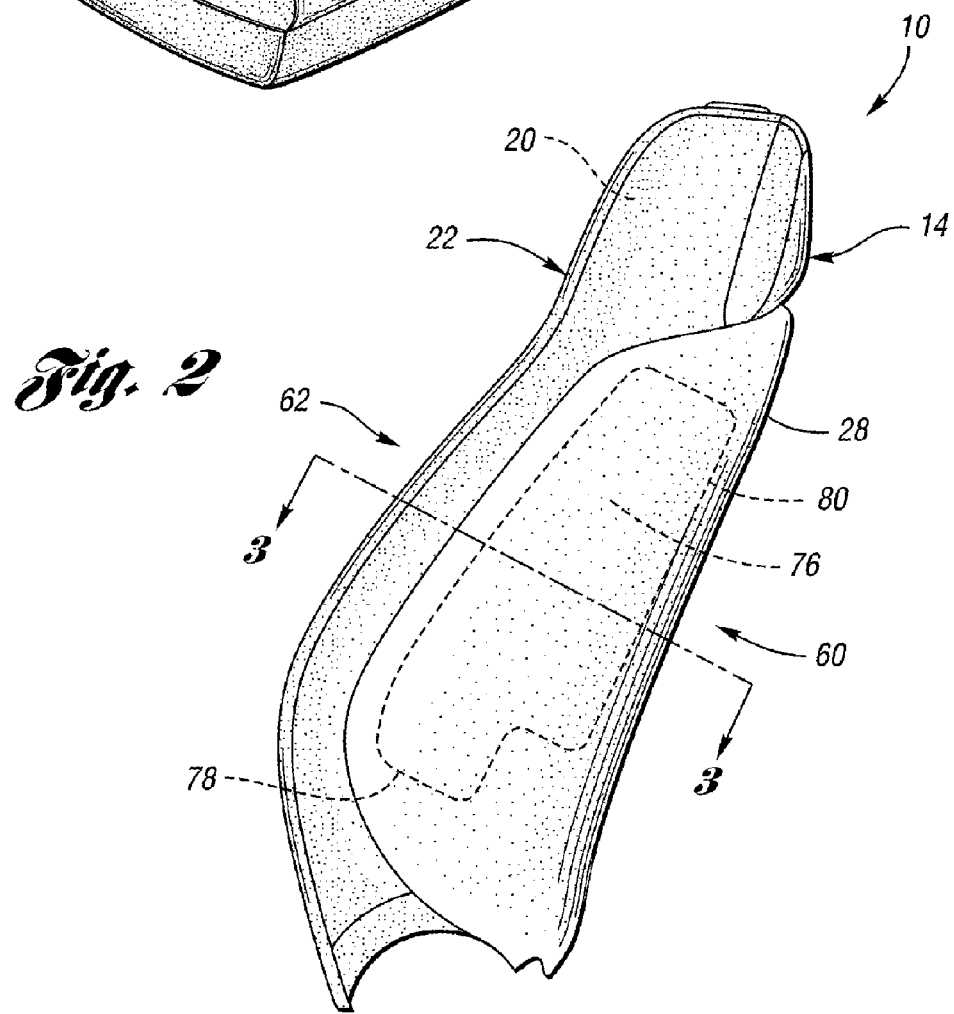
FIG. 2 is a side view of a portion of the vehicle seat assembly shown in FIG. 1.

Referring to FIGS. 2 and 3, the seat back 14 is shown in more detail. In the embodiment shown, the seat back 14 includes a seat pad or cushion 20, a trim cover 22, a frame 24, an air bag module 26, and a back panel 28.

The cushion 20 may have any suitable configuration and may be made of any suitable material, such as molded polymeric material like polyurethane foam. In the embodiment shown, the cushion 20 is disposed proximate the frame 24 and may be attached to the frame 24 at various locations.

The trim cover 22 is configured to form an exterior surface of the seat assembly 10. The trim cover 22 may be made of any suitable material, such as fabric, vinyl, and/or leather. The trim cover may be disposed proximate one or more surfaces of the cushion 20. In addition, the trim cover 22 may be attached to the cushion 20 in any suitable manner, such as with an adhesive, stitching, or fastener. In the embodiment shown, the trim cover 22 includes an end 30 that is detached from the cushion 20. The end 30 may be secured to the frame 24 using a fastener, such as a clip 32.

The frame 24 may have any suitable configuration and may be made of any suitable material, such as a polymeric material or metal. The frame 24 provides a support structure for the seat back 14.

The air bag module 26 includes a housing 40, an inflator 42, and an air bag 44. The air bag module 26 may be disposed in any suitable location. In the embodiment shown in FIG. 3, the air bag module 26 is disposed proximate the frame 24.

The housing 40 is configured to receive at least a portion of the air bag 44 when the air bag 44 is deflated. The housing 40 may have any suitable configuration. In the embodiment shown, the housing 40 includes an optional frangible portion 46 that is adapted to tear or sever in response to force exerted by the air bag 44 when the air bag 44 is inflated.

The inflator 42 is adapted to provide an inflation gas to the air bag 44. The inflator 42 may be disposed in any suitable location. In the embodiment shown in FIG. 3, the inflator 42 is disposed within the housing 40. Alternatively, the inflator 42 may be disposed outside the housing 40 and connected to the air bag 44 via a tube.

The air bag 44 is configured to expand from a stored condition to an inflated or deployed condition when the inflation gas is provided. More specifically, the air bag 44 is deflated and concealed by the housing 40 and/or back panel 28 when in the stored condition and is inflated and positioned between a seat occupant and an interior vehicle surface when in the inflated condition. In FIG. 3, the air bag 44 is shown in the stored condition.

The air bag 44 may have any suitable configuration and may be made of any suitable material. For example, the air bag 44 may be made of multiple panels that are assembled in any suitable manner, such as by stitching, bonding, or with an adhesive. Alternatively, the air bag 44 may be integrally formed. Optionally, the air bag 44 may include one or more tethers that control the shape of the air bag 44 upon deployment. The air bag 44 may be configured to cushion the head, thorax, and/or pelvis of the seat occupant when deployed.

The back panel 28 may have any suitable configuration. For example, the back panel 28 may wrap around the back and one or more sides of the seat assembly 10. In the embodiment shown in FIGS. 1–3, the back panel 28 includes a back portion 50, a first side portion 52, and a second side portion 54. The back portion 50 extends across a back side 60 of the seat assembly 10. The first and second side portions 52,54 extend from the back portion 50 toward the seating surface or front side 62 of the seat assembly 10. The first side portion 52 is disposed proximate a first side 64 of the seat assembly 10. The second side portion 54 is disposed proximate the second side 66 of the seat assembly 10 disposed opposite the first side 64. The back and side portions 50,52,54 may be integrally formed.

The back panel 28 is configured to conceal the air bag module 26 prior to air bag deployment. In the embodiment shown, the first side portion 52 extends further toward the front side 62 of the seat assembly 10 than the air bag module 26 to conceal the air bag module 26 when the air bag 44 is in the stored condition. The first side portion 52 may be spaced apart from the air bag module 26 such that a gap is formed. Optionally, a filler material may be disposed between the air bag module 26 and an interior surface of the back panel 28.

The first and/or second side portions 52,54 may include an end portion 68. The end portion 68 is disposed proximate and may be detached from the trim cover 22 when the air bag 44 is in the stored condition. The end portion 68 may be angled toward the trim cover 22 and may compress the cushion 20 to provide a gap-free appearance.

The back panel 28 may be attached to the seat assembly 10 in any suitable manner, such as with hooks, fasteners, and/or an adhesive.

The back panel 28 may have one or more layers. In the embodiment shown in FIG. 3, the back panel 28 includes a cover layer 70 and a substrate layer 72. The cover layer 70, which forms an exterior surface of the back panel 28, may be made of any suitable material, such as polymeric material, cloth, or leather. The substrate layer 72 is disposed proximate the cover layer 70. The substrate layer 72 may also be formed of any suitable material, such as a polymeric material like polypropylene. The cover and substrate layers 70,72 may be joined in any suitable manner, such as with an adhesive.

The back panel 28 includes a door 76 that is configured to open in response to force exerted by the air bag 44 when the air bag 44 is inflated. The door 76 may have any suitable configuration. In the embodiment shown in FIG. 1, the door 76 is at least partially defined by a tear seam or preweakened section 78 and a hinge 80.

The preweakened section 78 may define one or more sides of the door 78. The preweakened section 78 may have any suitable configuration. For example, the preweakened section 78 may be an indentation or perforation provided on one or more sides of the back panel 28 that may extend partially or completely through the back panel 28. The preweakened section 78 may also define an edge of the end portion 68.

The hinge 80 may be disposed on the back panel 28 in any suitable location. In the embodiment shown, the hinge 80 is disposed proximate the side portion 52. Alternatively, the hinge 80 may be disposed on the back portion 50. The hinge 80 may be configured not to tear or sever when the air bag 44 is deployed. In addition, the hinge 80 may be continuous or include a plurality of spaced-apart hinge portions or indentations.

Figure 4A:
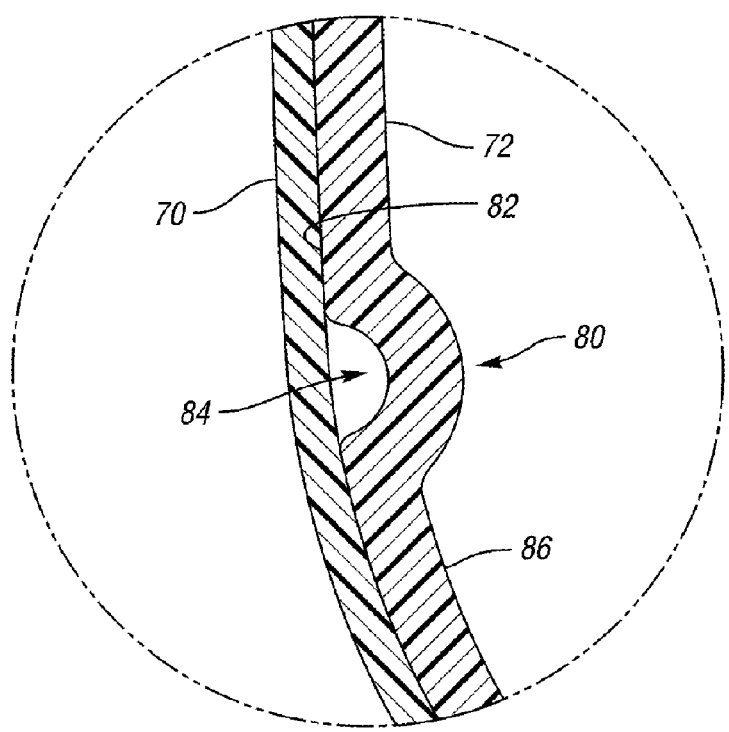
FIGS. 4A–4B are fragmentary section views of exemplary embodiments of a hinge portion of the vehicle seat assembly.
Figure 4B:
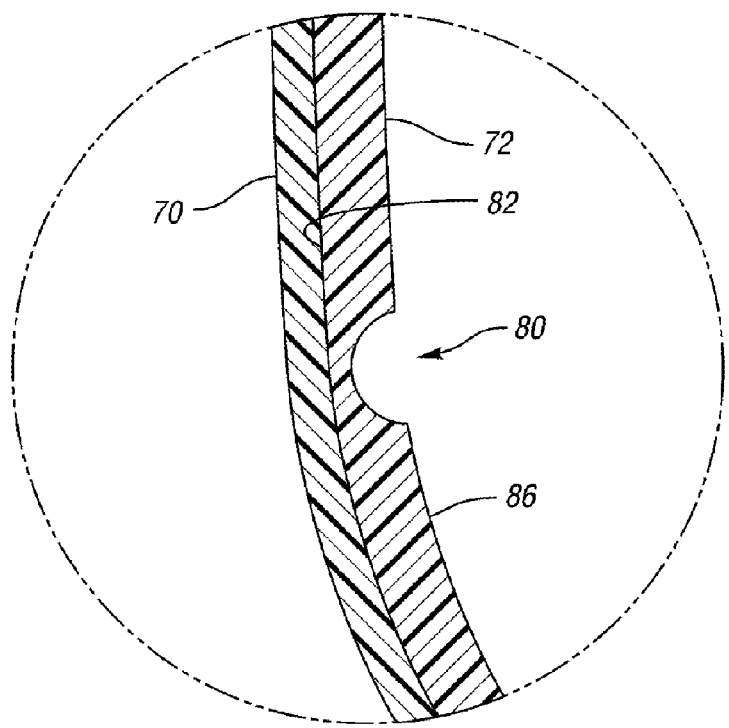

Referring to FIGS. 4A–4B, two exemplary embodiments of the hinge 80 are shown. The hinge 80 may have any suitable configuration and may be disposed on the cover layer 70 and/or substrate layer 72. In the embodiments shown in FIGS. 4A–4B, the hinge 80 is disposed on the substrate layer 72, thereby permitting the back panel 28 to have a seamless appearance. In FIG. 4A, the hinge 80 is disposed on a first surface 82 and extends away from the cover layer 70. As such, a void 84 may be formed between the hinge 80 and the cover layer 70. In FIG. 4B, the hinge 80 is disposed on a second surface 86 and extends toward the cover layer 70. Optionally, the hinge 80 may be disposed on any surface or combination of surfaces of the cover and/or substrate layers 70,72.

Referring again to FIG. 3, the back panel 28 may include a projection 90. The projection 90, which may be configured as a wall or panel, extends from an interior surface of the back panel 28 at any suitable angle to guide the air bag 44 away from the cushion 20 and toward the door 76 to reduce air bag deployment time. The projection 90 may have a smooth surface to reduce friction between the air bag 44 and the projection 90 during deployment.

The projection 90 may be disposed in any suitable location. In the embodiment shown, the projection 90 is disposed proximate the end portion 68 near the preweakened section 78. In addition, the projection 90 may extend around one or more sides of the door 76. For instance, the projection 90 may be disposed above, below, and/or along the sides of the door 76. In addition, the projection 90 may have any suitable length. For example, the projection 90 may extend along a side of the air bag module 26 as shown in FIG. 3 or may have a shorter length. The projection 90 may be integrally formed with the substrate layer 72. In addition, the projection 90 may be attached to another component, such as the frame 24 or cushion 20, to secure the end portion 68 to the seat assembly 10 and provide additional support.

Referring to FIGS. 5A–5B, an air bag deployment sequence for an embodiment of the present invention shown in FIG. 3 is shown.

In FIG. 5A, the air bag 44 has just started to be inflated. As the air bag 44 is inflated, it exerts force on the housing 40, causing the frangible portion 46 to separate and move toward the back panel 28. As additional inflation gas is provided, the air bag 44 expands from the housing 40 toward the back panel 28.

In FIG. 5B, the air bag 44 is shown later in the deployment sequence. Force exerted by the air bag 44 causes the preweakened section 78 to sever such that the door 76 pivots about the hinge 80 and away from the air bag module 26. An opening 94 is formed between the end portion 68 and the door 76. The air bag 44 expands into and through the opening 94 and toward a target deployment position located between the seat occupant and an interior vehicle surface. The air bag 44 may contact the projection 90 during deployment and be directed away from the cushion 20 and toward the door 80, thereby inhibiting compression of the cushion 20 and reducing deployment time.

The seat assembly of the present invention permits an air bag to deploy without severing stitches that join one or more trim panels. In addition, the present invention also permits an air bag to deploy without having to compress a seat cushion to create an aperture suitable for air bag deployment. As a result, air bag deployment time is reduced. Moreover, the present invention reduces manufacturing costs in that additional manufacturing steps associated with creating an air bag deployment path through the trim cover and/or cushion may be eliminated. Furthermore, the present invention also eliminates the tearing of foam, trim covers, and/or trim cover stitching when an air bag is deployed. As a result, the seat assembly may not require extensive repairs or replacement after an air bag is deployed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
    a frame;
    a cushion disposed proximate the frame;
    a trim cover disposed proximate the cushion;
    an air bag module disposed proximate the frame, the air bag module including an air bag and an inflator adapted to provide an inflation gas to inflate the air bag from a stored condition to an inflated condition; and
    a back panel having a substrate layer and a cover layer disposed proximate the substrate layer, the back panel disposed proximate the trim cover, the back panel including a back portion and a side portion disposed proximate the back portion, the side portion including a hinge and a preweakened section that cooperate to define a door, and an end section disposed proximate the preweakened section, the end section having an end surface disposed proximate the trim cover and a substantially smooth projection integrally formed with the substrate layer and projecting from the substrate layer toward the cushion for directing the air bag toward the door when the air bag is inflated.

2. The vehicle seat assembly of claim 1 wherein the side portion is longer than the air bag module and conceals the air bag module when the air bag is in the stored condition.

3. The vehicle seat assembly of claim 1 wherein the substrate layer includes the hinge section.

4. The vehicle seat assembly of claim 3 wherein the substrate layer further comprises a first surface disposed proximate the cover layer, a second surface disposed opposite the first surface, and the hinge section is an indentation disposed on the first surface.

5. The vehicle seat assembly of claim 3 wherein the substrate layer further comprises a first surface disposed proximate the cover layer, a second surface disposed opposite the first surface, and the hinge section is an indentation disposed on the second surface.

6. The vehicle seat assembly of claim 1 wherein the preweakened section is disposed on the substrate layer.

7. The vehicle seat assembly of claim 6 wherein the preweakened section extends toward the cover layer.

8. The vehicle seat assembly of claim 1 wherein the projection is disposed between the trim cover and the air bag module.

9. The vehicle seat assembly of claim 1 wherein the projection is disposed in a gap formed between the back panel, the air bag module, and the trim cover.

10. A vehicle seat assembly, comprising:
    a seat bottom; and
    a seat back disposed proximate the seat bottom, the seat back including:
        a frame,
        a cushion associated with the frame,
        a trim cover disposed proximate the cushion, a portion of the trim cover defining a front seat surface,
        an air bag module including a housing, an air bag, and an inflator configured to supply an inflation gas to the air bag, thereby facilitating deployment of the air bag;
        a back panel having a substrate layer and a cover layer disposed proximate the substrate layer, the back panel spaced apart from the air bag module and having a back portion and a side portion disposed proximate the back portion, the side portion extending further toward the front seat surface than the air bag module to conceal the air bag module when the air bag is deflated, the side portion including a hinge and a preweakened section that cooperate to define a door, and an end section disposed proximate the preweakened section, the end section including an end surface disposed proximate the trim cover and a substantially smooth projection integrally formed with the substrate layer and projecting from the substrate layer toward the housing for preventing the air bag from compressing the cushion when the air bag is inflated;

wherein the preweakened section severs to permit the door to pivot about the hinge when the air bag is deployed.

11. The vehicle seat assembly of claim 10 wherein the end surface contacts the trim cover when the air bag is inflated.

12. The vehicle seat assembly of claim 10 wherein the substrate layer includes the hinge section.

13. The vehicle seat assembly of claim 10 wherein the projection is further adapted to prevent the air bag from contacting the trim cover before the air bag is deployed through the door.

14. A vehicle seat assembly, comprising:
a frame;
a cushion disposed proximate the frame;
a trim cover disposed proximate the cushion;
an air bag module disposed proximate the frame, the air bag module including a housing, an air bag disposed proximate the housing, and an inflator adapted to provide an inflation gas to inflate the air bag from a stored condition to an inflated condition; and a back panel having an inner layer and an outer layer disposed proximate the inner layer, the back panel disposed proximate the trim cover, the back panel having a side portion spaced apart from the air bag module when the air bag is in the stored condition, the side portion including a hinge and a preweakened section that cooperate to define a door, and an end section disposed proximate the preweakened section and having a substantially smooth projection integrally formed with the inner layer and extending from the inner layer toward the air bag module for preventing the air bag from compressing the cushion when the air bag is inflated to reduce air bag deployment time.

15. The vehicle seat assembly of claim 14 wherein the projection is disposed between the preweakened section and the trim cover.

16. The vehicle seat assembly of claim 14 wherein the projection is spaced apart from the trim cover and the air bag module before the air bag is inflated.

* * * * *